United States Patent
Åström et al.

(10) Patent No.: US 9,005,832 B2
(45) Date of Patent: Apr. 14, 2015

(54) METHOD AND ARRANGEMENT FOR IMPROVED OPERABILITY OF A HIGH TEMPERATURE FUEL CELL SYSTEM

(71) Applicant: Convion Oy, Espoo (FI)

(72) Inventors: Kim Åström, Kirkkonummi (FI); Marko Laitinen, Vantaa (FI)

(73) Assignee: Convion Oy, Espoo (FI)

( * ) Notice: Subject to any disclaimer, the term of this patent is extended or adjusted under 35 U.S.C. 154(b) by 0 days.

(21) Appl. No.: 14/012,381

(22) Filed: Aug. 28, 2013

(65) Prior Publication Data
US 2014/0056035 A1  Feb. 27, 2014

Related U.S. Application Data (63) Continuation of application No. PCT/FI2012/050085, filed on Jan. 31, 2012.

(51) Int. Cl.
H01M 8/04 (2006.01)
H02M 3/335 (2006.01)
(Continued)

(52) U.S. Cl.
CPC ...... *H02M 3/33523* (2013.01); *H01M 8/04365* (2013.01); *H01M 8/04865* (2013.01);
(Continued)

(58) Field of Classification Search
CPC ................................................. H02M 3/33523
See application file for complete search history.

(56) References Cited

U.S. PATENT DOCUMENTS 6,255,008 B1    7/2001 Iwase
2002/0159280 A1* 10/2002 Zhu et al. ................. 363/98
(Continued)

FOREIGN PATENT DOCUMENTS

EP      0972668 A2    1/2000
JP      2010-277793 A  12/2010
(Continued)

OTHER PUBLICATIONS

International Search Report (PCT/ISA/210) issued on May 14, 2012, by the European Patent Office as the International Searching Authority for International Application No. PCT/FI2012/050085.
(Continued)

*Primary Examiner* — Maria J Laios
(74) *Attorney, Agent, or Firm* — Buchanan Ingersoll & Rooney PC (57) ABSTRACT

An arrangement for improved operability of a high temperature fuel cell device at higher fuel cell voltage values than nominal voltage values, each fuel cell in the fuel cell device including an anode side, a cathode side, and an electrolyte between the anode side and the cathode side, and the arrangement includes means for determining temperature information of the fuel cells and main power converter for loading fuels cells at least up to their rated power level. The arrangement includes a non-isolating pre-regulator for reducing the fuel cell voltage to a voltage level useable for the main power converter at least at substantially low power levels in start-up and low current load situations when the fuel cell voltage is significantly higher than in nominal operation conditions, the pre-regulator being located between the fuel cells and the main power converter, and the arrangement includes bypass means for bypassing the pre-regulator at substantially high current loads when the fuel cell voltage has decreased to the voltage level suitable for an input voltage of the main power converter.

17 Claims, 6 Drawing Sheets

(51) Int. Cl.
    *H01M 8/18* (2006.01)
    *H01M 8/12* (2006.01)
(52) U.S. Cl.
    CPC .......... *H01M8/0488* (2013.01); *H01M 8/0491* (2013.01); *H01M 8/04955* (2013.01); *H01M 8/186* (2013.01); *H01M 8/04268* (2013.01); *H01M 2008/1293* (2013.01); *Y02E 60/528* (2013.01); *Y02E 60/525* (2013.01)

(56) References Cited

U.S. PATENT DOCUMENTS

| | | |
|---|---|---|
| 2006/0170570 A1 | 8/2006 | Chatroux et al. |
| 2008/0277175 A1 | 11/2008 | Tyler et al. |
| 2010/0068564 A1 | 3/2010 | Su et al. |
| 2012/0040263 A1 | 2/2012 | Taniguchi |

FOREIGN PATENT DOCUMENTS

| | | |
|---|---|---|
| WO | WO 2007/124518 A1 | 11/2007 |
| WO | WO 2010/122868 A1 | 10/2010 |

OTHER PUBLICATIONS

Written Opinion (PCT/ISA/237) issued on May 14, 2012, by the European Patent Office as the International Searching Authority for International Application No. PCT/FI2012/050085.

International Preliminary Report on Patentability (PCT/IPEA/409) issued on May 7, 2013, by the European Patent Office as the International Searching Authority for International Application No. PCT/FI2012/050085.

Finnish Search Report issued Nov. 25, 2011 for Finnish Application No. 20115202.

\* cited by examiner

METHOD AND ARRANGEMENT FOR IMPROVED OPERABILITY OF A HIGH TEMPERATURE FUEL CELL SYSTEM

RELATED APPLICATION(S)

This application claims priority as a continuation application under 35 U.S.C. §120 to PCT/FI2012/050085, which was filed as an International Application on Jan. 31, 2012 designating the U.S., and which claims priority to Finnish Application No. 20115202 filed in Finland on Feb. 28, 2011. The entire contents of these applications are hereby incorporated by reference in their entireties.

FIELD

Fuel cell devices can fulfill different kinds of electricity production needs. Fuel cell devices are electrochemical devices supplied with reactants for producing electrical energy.

BACKGROUND INFORMATION

Fuel cell devices are electrochemical devices, which enables production of electricity with high duty ratio in an environmentally friendly process. Fuel cell technology is considered as one of the most promising future energy production methods.

Figure 1:
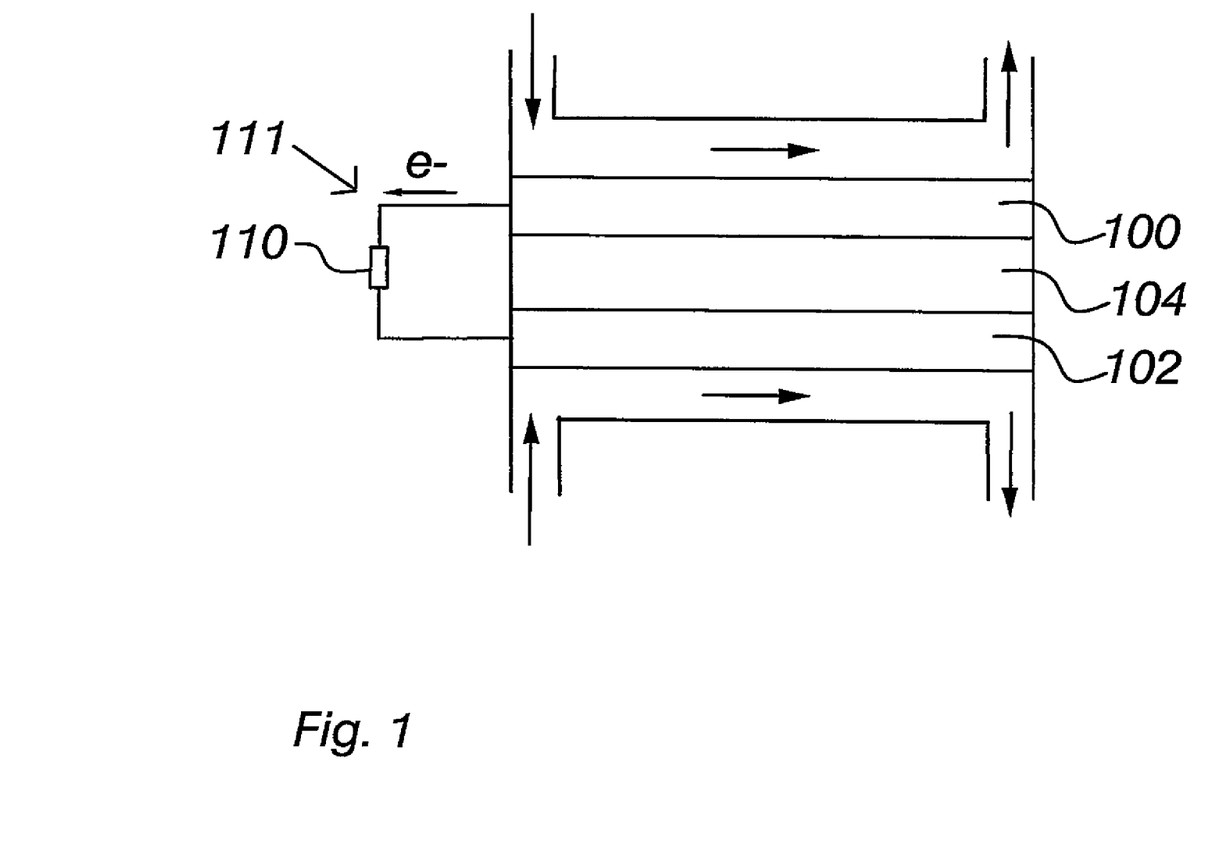
FIG. 1 depicts an exemplary single fuel cell structure.

A fuel cell, as presented in FIG. 1, comprises an anode side 100 and a cathode side 102 and an electrolyte material 104 between them. The reactants fed to the fuel cell devices undergo a process in which electrical energy and heat are produced as a result of an exothermal reaction.

In solid oxide fuel cells (SOFCs), oxygen 106 is fed to the cathode side 102 and it is reduced to a negative oxygen ion by receiving electrons from the cathode. The negative oxygen ion goes through the electrolyte material 104 to the anode side 100 where it reacts with the used fuel 108 producing water and also, for example, carbon dioxide ($CO_2$). Between the anode and cathode is an external electric circuit 111 for transferring electrons e– to the cathode. The external electric circuit 111 comprises a load 110.

Figure 2:
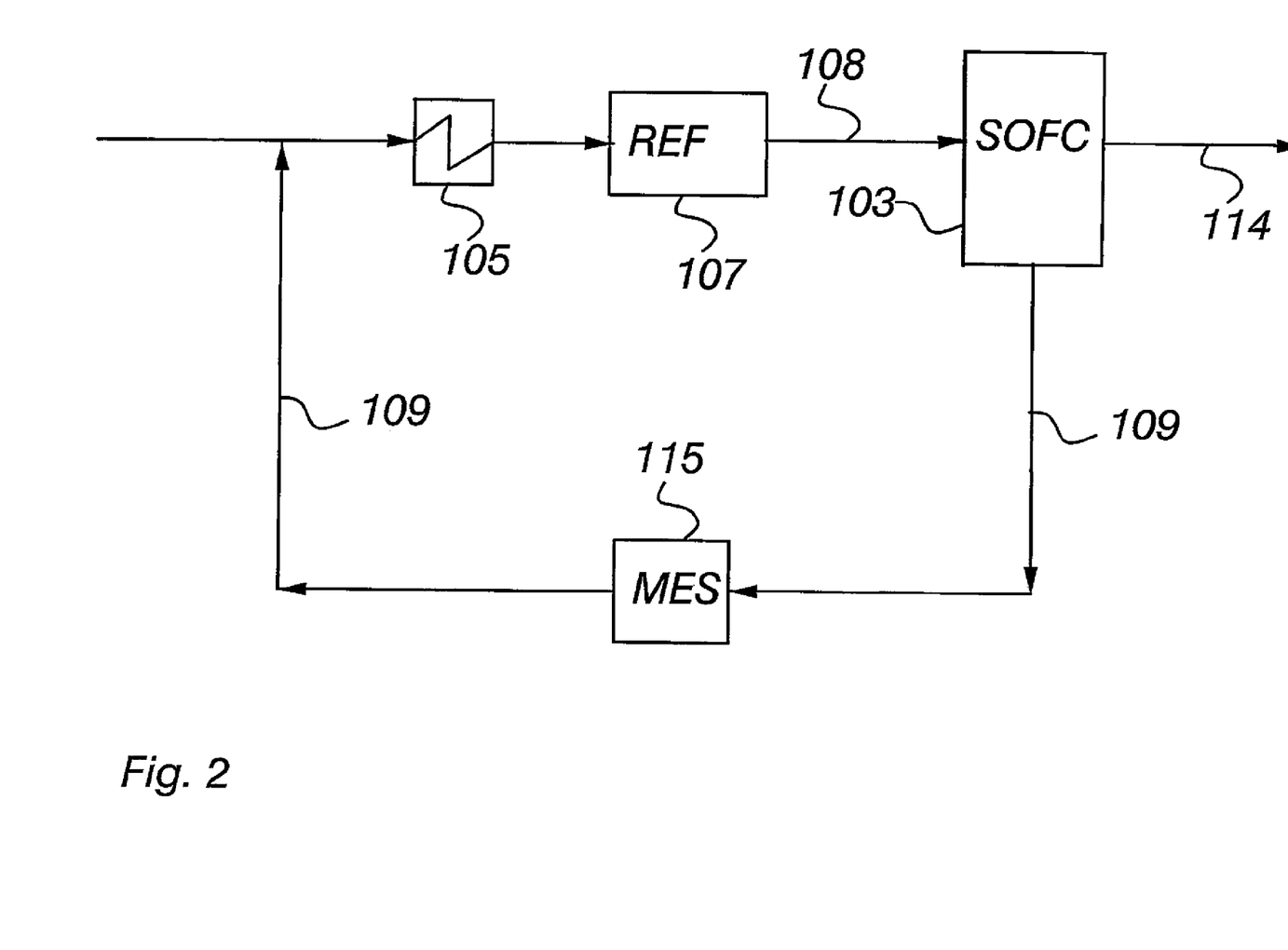
FIG. 2 depicts an exemplary fuel cell device.

FIG. 2 depicts an SOFC device, which can utilize as fuel for example natural gas, bio gas, methanol or other compounds containing hydrocarbons. SOFC device in FIG. 2 comprises planar-like fuel cells in stack formation 103 (SOFC stack). Each fuel cell comprises an anode 100 and cathode 102 structure as presented in FIG. 1. Part of the used fuel is recirculated in feedback arrangement 109 through each anode.

The SOFC device in FIG. 2 comprises a fuel heat exchanger 105 and a reformer 107. Heat exchangers are used for controlling thermal conditions in fuel cell process and more than one of them can be located in different locations of an SOFC device. The extra thermal energy in circulating gas is recovered in the heat exchanger 105 to be utilized in SOFC device or outside in a heat recovering unit. The heat recovering heat exchanger can thus be located in different locations than that presented in FIG. 2. The reformer is a device that converts the fuel such as, for example, natural gas to a composition suitable for fuel cells, for example, to a composition containing half hydrogen and other half methane, carbon dioxide and inert gases. The reformer is not, however, necessary in all fuel cell implementations, because untreated fuel may also be fed directly to the fuel cells 103.

Measurement means 115 (such as fuel flow meter, current meter and temperature meter) can be used to carried out measurements for the operation of the SOFC device from the through anode recirculating gas. Only part of the gas used at anodes 100 (FIG. 1) of the fuel cells 103 is recirculated through anodes in feedback arrangement 109. FIG. 2 depicts diagrammatically another part of the gas being exhausted 114.

Heat management of the fuel cell stacks is one of the key functions of the balance of plant (BoP) equipment in a high temperature fuel cell system. The heat balance of the fuel cells stacks is affected by many mechanisms including internal reforming, fuel cell reactions, heat transport by flow of reactants and direct heat exchange with the surrounding structures. Exemplary methods for the control of the temperature balance comprise adjustment of the internal reforming rate and adjustment of air flow and cathode inlet temperature.

System heaters can be implemented as electrical heaters comprising heating resistors or gas burners or a combination thereof. Benefits of electrical heaters include excellent controllability and the ability to place them directly in reactant streams or structures to be heated. A drawback of electrical heaters is their tendency to generate earth fault currents, particularly in the case of high temperature heaters. Also fuel cell stacks, being high temperature electrical devices, may generate significant earth fault currents depending on isolation arrangements in their reactant feed, supporting structures and loading arrangement.

High temperature fuel cells (MCFC, SOFC) have operating temperatures in the range of 600-1000° C. High temperatures are used to achieve sufficient conductivity for proper operation, i.e., sufficiently low area specific resistance (ASR) to draw currents from the fuel cells. Below their nominal operating temperature, these fuel cells experience an increased ASR, which limits the amount of current that can be drawn from the cells. Since heat production in the cells is proportional to the current, sufficient heat production within the fuel cell for maintaining an operating temperature is not achievable until at relatively high currents. For example, 50% of nominal current or higher can be required before the heat production within the stack suffices to compensate for mechanisms of heat removal. These mechanisms for heat removal include endothermic reactions taking place at fuel cell anodes (internal reforming), heat transport by reactant flow and heat transfer to surroundings.

As a consequence of the inability of stacks to internally heat up at low temperatures, heat is applied from an external source in system start-up until fuel cells are relatively close to their nominal operating temperature, allowing for currents large enough to bring the heating further. A convenient method for applying external heat to fuel cell stacks during start-up is to utilize electrical heaters offering excellent controllability and flexibility with respect to placement at a moderate price. The price and complexity of electrical heaters is in turn strongly related to the maximum temperature and heat duty at which the heaters are required to operate. Hence, the last tens of degrees required from the electrical heaters in order to bring the fuel cells up to near-nominal temperatures can determine their dimensions. A small reduction in the maximum temperature that needs to be achieved or in the heat duty that needs to be delivered at this temperature would have a significant effect on system compactness and on heater sizing, thus also reducing economical costs.

For example, a significant mechanism for heat removal inside stacks is internal steam reforming in which methane reacts with steam, i.e., $H_2O$, to hydrogen and carbon monoxide in a strongly endothermic process:

During nominal operation of the fuel cell, this mechanism of heat removal is beneficial in reducing the need for stack cooling by other means e.g., excessive air feed. In a system, the internal reforming may account for up to 75% or more of the heat removal from stack reactions. During system heat-up, the cooling effect of internal reforming is, in turn, clearly a negative effect as it increases the amount of heat that needs to be applied from external sources, e.g., electrical heaters. The amount of internal reforming depends on the fuel feed and the extent of reforming that takes place outside the stacks, e.g., in a pre-reformer. In the absence of a pre-reformer or in the case of an adiabatic pre-reformer, most of the internal reforming will take place in the stack thus providing a significant cooling effect proportional to the fuel feed. The fuel feed is in turn substantially proportional to the current as system fuel utilization is better to be maintained in a narrow range, for example, 75-85%.

Another problem is that fuel cell voltage does not sink linearly as a function of loading current. In a starting stage of the loading, voltage is much higher than in nominal loading conditions. For example, it can be beneficial for power electronics to be designed to withstand high voltage in the start up. This can lead to non-optimal component selection because higher voltage rated components suffers from considerably higher power losses in nominal loading conditions.

SUMMARY

According to an exemplary aspect, disclosed is an arrangement for improved operability of a high temperature fuel cell device at higher fuel cell voltage values than nominal voltage values, wherein each fuel cell in the fuel cell device comprises an anode side, a cathode side, and an electrolyte between the anode side and the cathode side, wherein the arrangement comprises: a main power converter for loading fuel cells at least up to their rated power level, the main power converter comprising galvanic isolation, a non-isolating pre-regulator suitable for reducing the fuel cell voltage to a voltage level useable with the main power converter at least at substantially low power levels in start-up and low current load situations when the fuel cell voltage is significantly higher than in nominal operation conditions, said pre-regulator being located between the fuel cells and the main power converter, and said pre-regulator being dimensioned for partial load current, and bypass means suitable for bypassing the pre-regulator at substantially high current loads when the fuel cell voltage has decreased to the voltage level suitable for an input voltage of the main power converter.

A method for improved operability of a high temperature fuel cell device at higher fuel cell voltage values than nominal voltage values, the method comprising: loading fuel cells at least up to their rated power level by a main power converter, which is galvanically isolated, arranging a non-isolating pre-regulator between the fuel cells and the main power converter, which pre-regulator is dimensioned for partial load current, using said pre-regulator to reduce the fuel cell voltage to a voltage level useable by the main power converter at least at substantially low power levels in start-up and low current load situations when the fuel cell voltage is significantly higher than in nominal operation conditions, and bypassing the pre-regulator at substantially high current loads, when the fuel cell voltage has decreased to a voltage level suitable for an input voltage of the main power converter.

DETAILED DESCRIPTION

In an exemplary aspect, savings in power electronics of the fuel cell device both in reduced economical costs and in reduced power losses can be achieved. This is achieved, for example, by an arrangement for improved operability of a high temperature fuel cell device at higher fuel cell voltage values than nominal voltage values, each fuel cell in the fuel cell device comprising an anode side, a cathode side, and an electrolyte between the anode side and the cathode side. The arrangement comprises means for determining temperature information (e.g., essential temperature information) of the fuel cells and main power converter for loading fuel cells at least up to their rated power level. The arrangement comprises a non-isolating pre-regulator for reducing the fuel cell voltage to a voltage level useable for the main power converter at least at substantially low power levels in start-up and low current load situations when the fuel cell voltage is significantly higher than in nominal operation conditions, said pre-regulator being located between the fuel cells and the main power converter, and the arrangement comprises bypass means for bypassing the pre-regulator at substantially high current loads when the fuel cell voltage has decreased to the voltage level suitable for an input voltage of the main power converter.

Also disclosed is a method for improved operability of a high temperature fuel cell device at higher fuel cell voltage values than nominal voltage values, in which method temperature information (e.g., essential temperature information) of fuel cells is determined, and the fuel cells are loaded at least up to their rated power level by a main power converter. In the method a non-isolating pre-regulator is located between the fuel cells and the main power converter, and by using said pre-regulator the fuel cell voltage is reduced to a voltage level useable for the main power converter at least at substantially low power levels in start-up and low current load situations when the fuel cell voltage is significantly higher than in nominal operation conditions, and the pre-regulator is bypassed at substantially high current loads, when the fuel cell voltage has decreased to the voltage level suitable for an input voltage of the main power converter.

An exemplary embodiment is based on utilization of a non-isolating pre-regulator located between the fuel cells and the main power converter to reduce the fuel cell voltage to a voltage level useable for the main power converter at least at substantially low power levels when the fuel cell voltage is significantly higher than in nominal operation conditions. Then, the non-isolating pre-regulator is bypassed at substantially high current loads, when the fuel cell voltage has decreased to the voltage level suitable for an input voltage of the main power converter.

An exemplary benefit of the disclosure is that power electronics components can be dimensioned to lower voltage values, and thus economical savings are achieved. Power losses can be minimized in nominal operating conditions because, for example, 300 V dimensioned power electronics components cause 50% less power losses than 500 V dimensioned power electronics components in nominal operating conditions. This can reduce cooling requirements of the high temperature fuel cell device, and the system size can be more compact.

Figure 3:
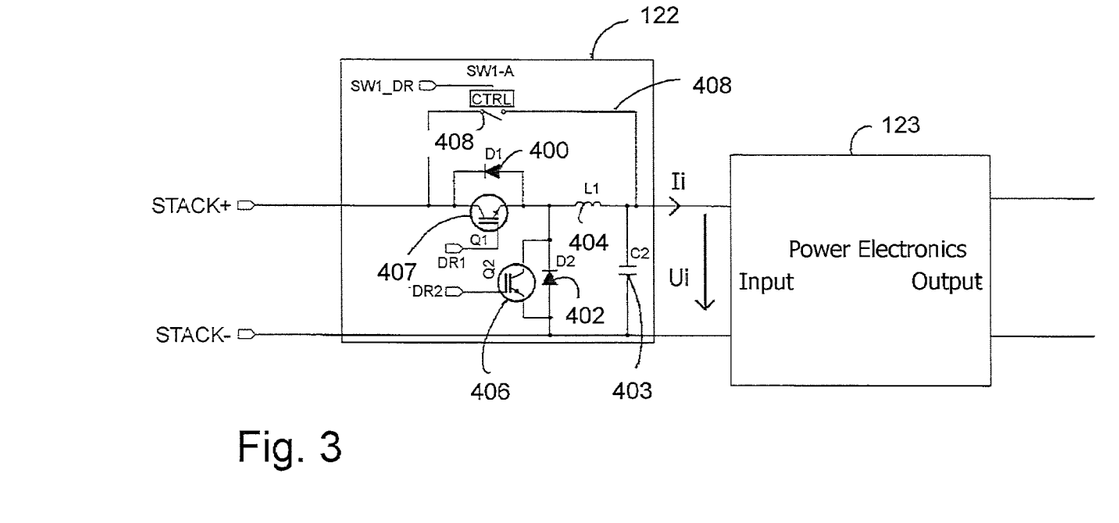
FIG. 3 depicts an exemplary embodiment.
Figure 5:
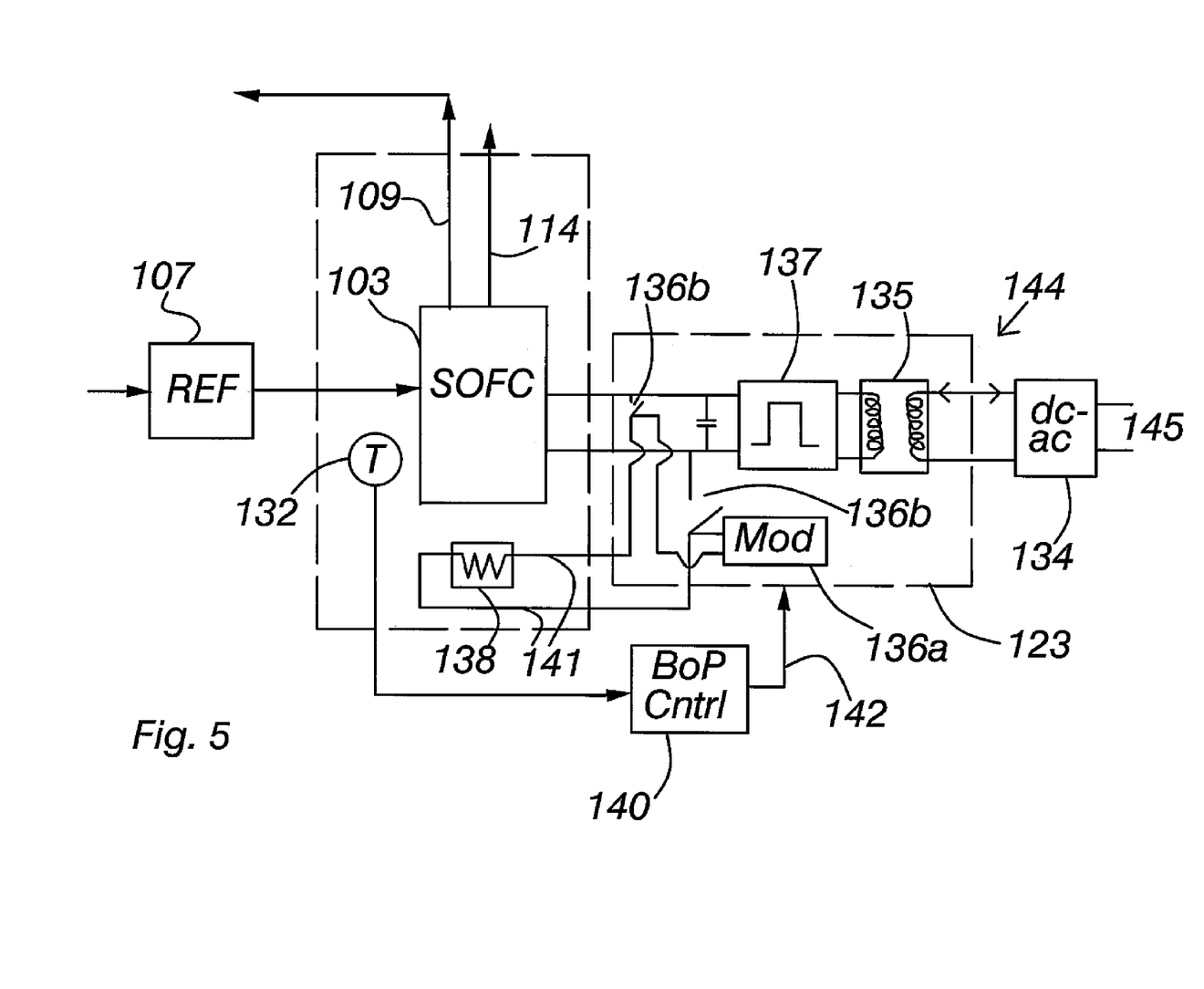
FIG. 5 depicts an exemplary DC-DC converter topology for bi-directional power flow.

FIGS. 3 and 5 depict an exemplary arrangement according to the present disclosure. This arrangement focuses on improved operability of a high temperature fuel cell device at higher fuel cell voltage values than nominal voltage values. The arrangement comprises means 132 for determining temperature information (e.g., essential temperature information) of fuel cells 103, which are arranged in stack formation comprising several fuel cell stacks 103. The means 132 can be implemented by using any suitable temperature measurement technology. A function of a main power converter 123, i.e., an isolating power stage 123, is to generate load current to load fuel cell stacks 103 at least up to their rated power level. In an exemplary arrangement, the maximum allowed input voltage of the main power converter 123 is less than the maximum fuel cell voltage. Furthermore, the arrangement comprises a non-isolating pre-regulator 122, which is located between the fuel cell stacks 103 and the main power converter 123. The pre-regulator 122 reduces the fuel cell voltage to a voltage level useable for the main power converter 123. This is performed at least at substantially low power levels in start-up and low current load situations when the fuel cell voltage is significantly higher than in nominal operation conditions.

At substantially high current loads when the fuel cell voltage has decreased to the voltage level suitable for the input voltage of the main power converter, bypass means 408 are used for bypassing the pre-regulator 122. In an exemplary arrangement, the bypass means 408 comprise a relay mechanism for switching operations used for changing the operation mode of the bypass means 408. The maximum allowed current of the pre-regulator 122 can be less than 50% of the rated current of the fuel cells 103.

As shown in FIG. 3, an exemplary pre-regulator 122 comprises voltage drive components for driving operation in the loading of the fuel cell stacks 103, for example, in the starting stage of the loading. The power stage topology of the pre-regulator 122 can be capable of boost operation in a reversed power flow mode, which will be described in more detail later on related to bidirectional operation of the main power converter 123. In FIG. 3, an example of the pre-regulator topology comprises as the voltage drive components at least four discrete semiconductors, i.e., two diodes 400, 402, a capacitor 403, and one inductive component, i.e., a coil 404, and transistor switches 406, 407 in parallel connection to the diodes 400, 402. The transistor switches 406, 407 can be realized by IGBT, mosfet, jfet, bibolar or by some other transistors. For operating the boost operation, i.e., for driving operation of the non-isolating pre-regulator stage from a lower voltage level to a higher voltage level, switch 406 and diode 400 are used. In the beginning of loading, when voltage of the fuel cells are close to the Nernst potential voltage, the pre-regulator is, in turn, used in power stage operation mode to reduce the stack voltage level to, e.g., 0.9V/cell, by using switch 407 and diode 402. Thus there is no need to dimension the main power converter for capability of handling high start-up voltages of fuel cells, thus allowing for a more optimized design of the main power converter with respect to nominal power operation. Correspondingly, the pre-regulator need not be dimensioned for the full power level of the fuel cells 103. By equipping the pre-regulator 122 with the bypass means 408 comprising a bypass wiring 408 and a bypass switch 408 (FIG. 3), which can be a relay mechanism, the pre-regulator can be bypassed at, e.g., a power level of 30% of nominal level whereby stack voltages have decreased from peak values down to a range which can be tolerated directly by the main power converter 123. Dimensioning the pre-regulator for only partial load current allows for significant cost reductions in components and related cooling arrangements. For example, a current level of 30% of nominal current is also sufficient for the electrolysis mode of operation.

Figure 4:
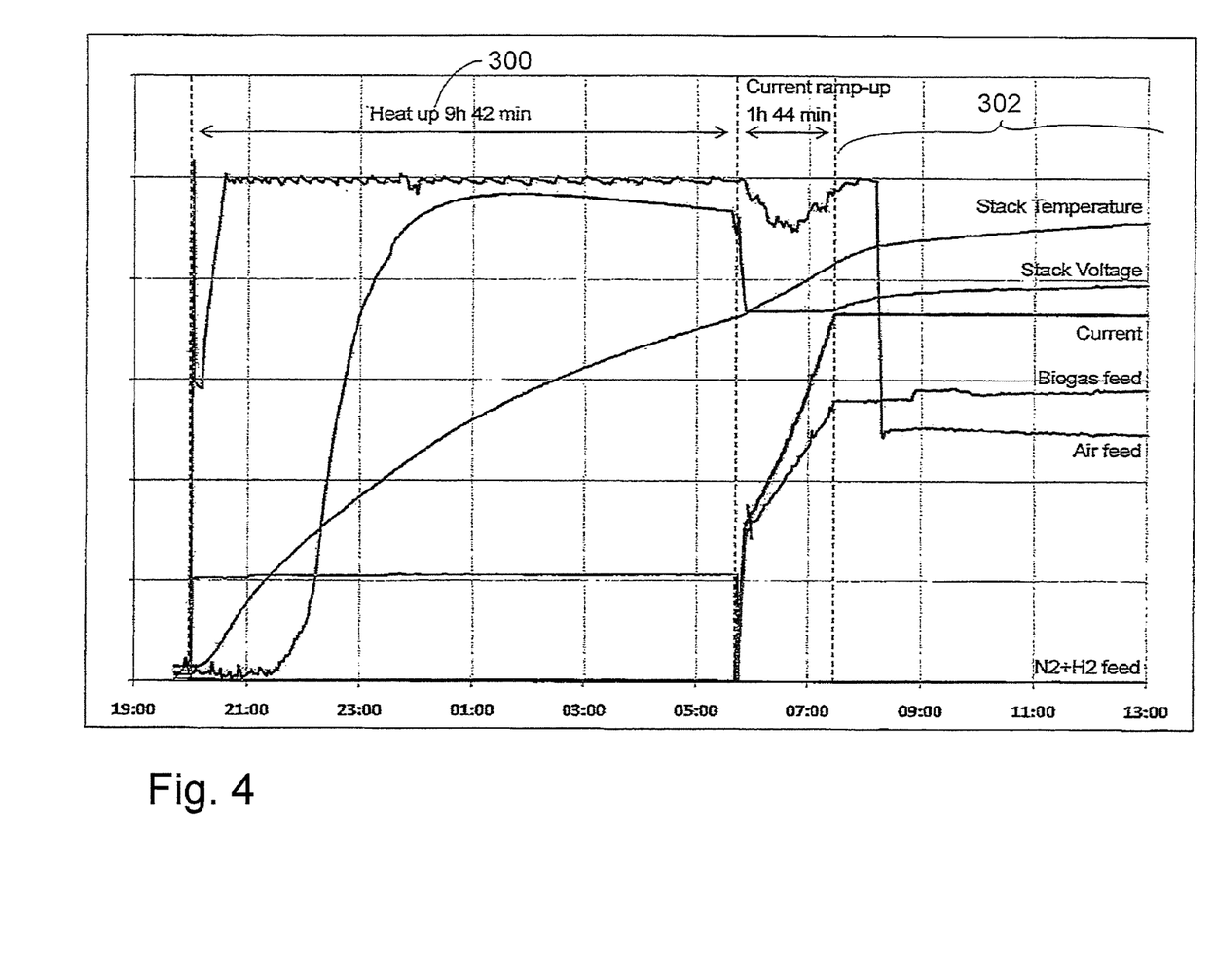
FIG. 4 depicts an exemplary curve diagram of a start-up process of the high temperature fuel cell device.

FIG. 4 depicts an exemplary curve diagram of a start-up process of the high temperature fuel cell device. In the first stage 300 of the heating process of the fuel cell stacks 103, for example, the electrolysis mode of operation 300, fuel cell stack voltage values are substantially higher than nominal voltage values in normal operation mode 302 of the fuel cells 103. FIG. 4 also describes how load current changes in the heating process, for example, with respect to the stack voltage values and stack temperature values.

In an exemplary arrangement, the main power converter 123 comprises galvanic isolation. In the described exemplary embodiment utilizing the non-isolating pre-regulator between the fuel cell stacks 103 and the isolating main power converter, the additional cost associated to the capability of electrolysis operation is very limited, because there is utilized the adaptability of the main power stage for bi-directional power flow. In many isolating topologies, among them the exemplary full-bridge topology, capability for bi-directional power flow can be arranged at relatively low cost with minimum additional complexity. The capability of bidirectional power flow in the main converter can be utilized also for other functions than the start-up operation, such as for isolating operating resistors from the grid. Thus, for example, the cost overhead related only to the capability of the described electrolysis operation remains low in comparison to the system benefits.

The main power converter 123 can comprise means for performing a bi-directional power flow. FIG. 5 depicts an exemplary arrangement in which an isolating DC-DC (Direct Current-Direct Current) converter is utilized as the main power converter 123 for loading fuel cell stacks 103 and for operating at substantially high frequencies, which are, for example, 10-100 kHz. FIG. 5 depicts a DC-DC converter topology which is capable of utilizing bi-directional power flowing 144 by utilizing power electronics switching means 137 for controlling bi-directional power flow through the converter. Said means 137 are arranged, for example, by additional semiconductors, additional control electronics and power electronics switches. The DC-DC converter comprises inherently a galvanic isolation stage which as such can be utilized to provide isolation also for an at least one heating resistor 138 provided that overall power rating (in any direction) of the isolation stage need not be increased. Thus, said at least one heating resistor is allowed to be located via a DC (Direct Current) voltage connection 141 in parallel with the fuel cell stacks 103 in the fuel cell side. Consequently, the at least one heating resistor utilizes the same galvanic isolation as the fuel cell stacks with a minimum increase in component count and cost compared to a single-directional converter. Because the converter according to the disclosure is arranged to perform bi-directional power flow through the addition of a few semiconductor switches, it is possible to feed more power to the at least one heating resistor from the converter than the related fuel cell stacks 103 are producing, for example, during system heat-up.

The embodiment of FIG. 5 further comprises active control means 136 for pulse width modulation (PWM) of the heating resistors 138, said means 136, for example, being integrated with the DC/DC converter 123. The control processor 136a can be accomplished of analog electronics processor and/or digital electronics processor. The switching means 136b are, for example, bipolar transistor, JFET transistor, MOSFET transistor, IGBT or some other transistor switches. Also the arrangement comprises a balance-of-plant (BoP) control system 140 for determining a heating power set point. The control system 140 communicates with the DC-DC converter 123, for example, to command the heating power set point to the converter 123. Said communication can be performed via a serial communication arrangement 142 to optimize use of instrumentation cabling.

Part of the fuel cells in an anode circulated system can be utilized in an electrolysis mode of operation thus producing hydrogen, which in turn is consumed by other fuel cells that are simultaneously loaded to enhance the heat-up of high temperature fuel cells in the end of the heating phase. Due to the internal circulation of power (and hydrogen) in the fuel cell loop, the amount of fresh fuel feed (i.e., methane) required for driving current in the fuel cells is significantly reduced and thereby the amount of stack cooling by internal reforming can be significantly reduced. This enhances the heating of fuel cells and reduces the need and requirements for external heating, e.g., electrical heaters 138 (FIG. 5), in start-up. In the electrolysis mode of operation, the pre-regulator 122 can be utilized for boost operation to inject an electrolysis current to the fuel cells 103, i.e., the pre-regulator is used to boost the voltage of the isolating stage (e.g., 0.9V/fuel cell) to the level required for electrolysis.

Figure 6:
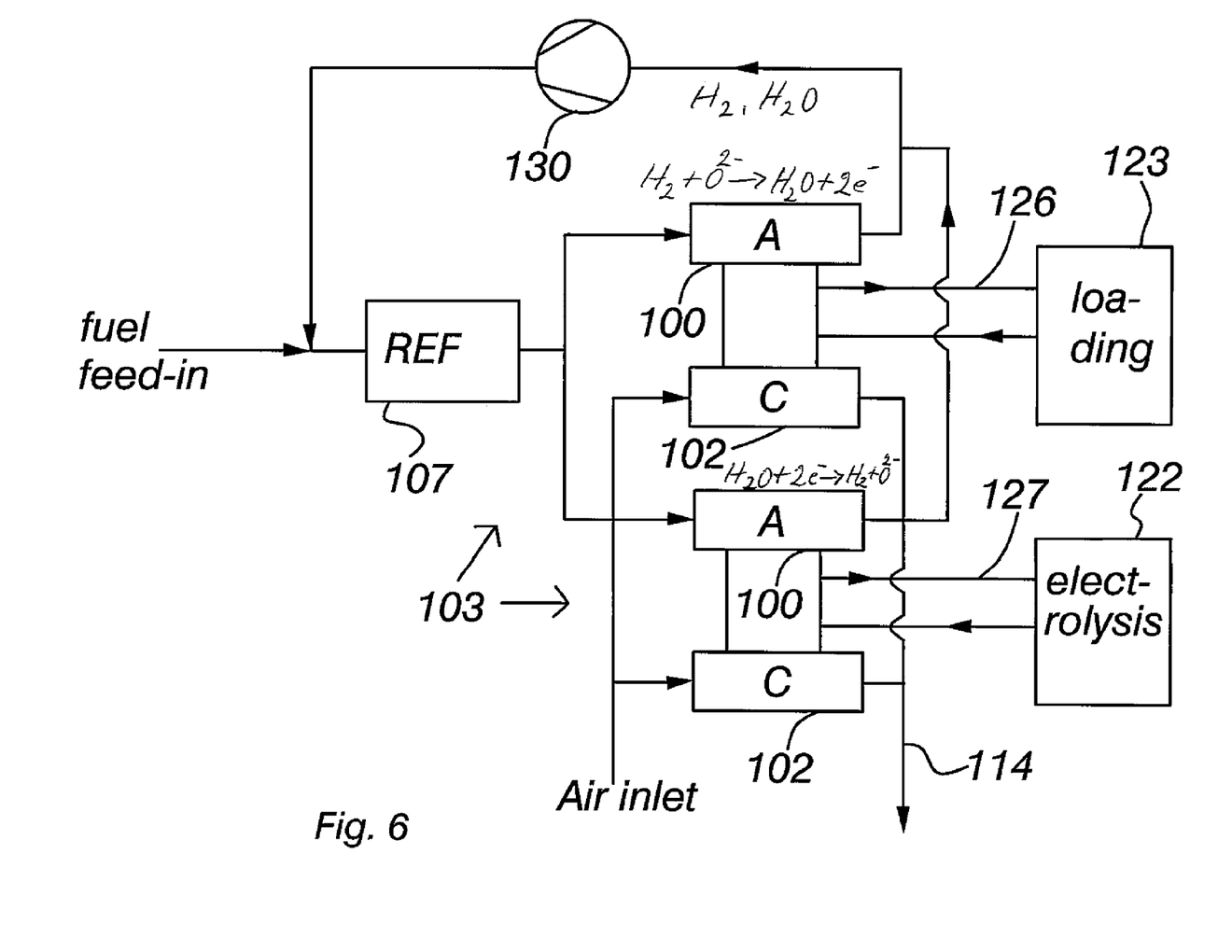
FIG. 6 depicts an exemplary embodiment for enhanced heating of the fuel cell stacks.

FIG. 6 depicts an exemplary embodiment according to the present disclosure for enhanced heating of the fuel cell stacks 103 by a significant reduction of the internal reforming and without the need for external reforming means. This is based on operating a part of at least two groups of fuel cells in electrolysis mode of operation while utilizing anode circulation to recirculate the formed hydrogen back to the fuel feed, available for being used by the other part of fuel cells being operated in normal fuel cell mode.

Letter A symbolizes anode sides of the fuel cells 103, and letter C symbolizes cathode sides of the fuel cells 103. Reference sign 126 symbolizes load current of the fuel cells being loaded, and reference sign 127 symbolizes electrolysis current of the fuel cells being operated in electrolysis mode of operation. Reference sign 130 represents a blower in a feedback as shown in FIG. 6. In the fuel cell stacks being operated in electrolysis mode, the fuel cell reactions are reversed with respect to normal fuel cell mode operation $$H_2+O^{2-}\rightarrow H_2O\,2e^-$$

whereas in the other part of fuel cells operating normally the reaction for hydrogen is $$H_2+O^{2-}=H_2O+2e^-$$

If the two reactions are balanced, i.e., electrolysis and normal loading reactions occur at equal rates, fuel ($CH_4$) supply can, in theory, be totally discontinued while water and hydrogen is being circulated within the system. In practice, a small amount of $CH_4$ supply and possibly water supply can be used to assure that a reducing atmosphere with sufficient steam content can be maintained at all anodes. If recirculation rate is substantially high with respect to the fuel feed and reactant formation at anodes, gas concentrations at different stacks will effectively even out.

In the above-described fuel cell reactions, heat is generated without a current-proportional amount of heat being consumed in methane steam reformation. In essence, power is being circulated in a loop between electrolysis and normal operation mode stacks in a manner resulting in loss. Main heat losses occur at the stacks which are hence heated. Due to the achievable significant reduction of internal reforming, less external heating is required and moreover, stacks will become heat-balanced at lower currents, e.g., 25% of nominal compared to, e.g., 50% of nominal with internal reforming. Hence, requirements on electrical heaters can be achieved with smaller and cheaper heaters enabling a more compact system as a result.

In order to operate stacks in an electrolysis mode of operation, for example, a voltage higher than the Nernst potential and current feed into the stacks can be required. In an exemplary embodiment, means to produce said voltage (higher than the Nernst potential) and reversed current are incorporated to the power electronics that normally act as a load for the stacks. Hence, for example, the power electronics have to be capable of bidirectional power flow and capable of operating a stack voltage significantly higher than in a loading mode. These stack voltage values are, for example, 1.2-1.5 V per fuel cell in electrolysis and 0.7-0.9 V per fuel cell in loading. For example, the topology of the power electronics is of such type that a need for capability to operate at a higher voltage does not cause any adverse point of operation in the normal loading mode. This is the case, for example, in non-isolated step-up topologies.

Although SOFC fuel cell devices are described herein, exemplary embodiments can be utilized in different kinds of high temperature fuel cell devices such as, for example, in MCFC (Molten Carbonate Fuel Cells) devices. MCFCs are high temperature fuel cells that use an electrolyte composed of a molten carbonate salt mixture suspended in a porous, chemically inert ceramic matrix.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. An arrangement for improved operability of a high temperature fuel cell device at higher fuel cell voltage values than nominal voltage values, wherein each fuel cell in the fuel cell device comprises an anode side, a cathode side, and an electrolyte between the anode side and the cathode side, wherein the arrangement comprises:
   a main power converter for loading fuel cells at least up to their rated power level, the main power converter comprising galvanic isolation,
   a non-isolating pre-regulator for reducing the fuel cell voltage to a voltage level useable with the main power converter at least at substantially low power levels in start-up and low current load situations when the fuel cell voltage is substantially higher than in nominal operation conditions, said pre-regulator being located between the fuel cells and the main power converter, and said pre-regulator being dimensioned for partial load current, and
   bypass means for bypassing the pre-regulator at substantially high current loads when the fuel cell voltage has decreased to the voltage level suitable for an input voltage of the main power converter.

2. The arrangement according to claim 1, wherein the maximum allowed input voltage of the main power converter is less than the maximum fuel cell voltage.

3. The arrangement according to claim 1, wherein the maximum allowed current of the pre-regulator is less than 50% of the rated current of the fuel cells.

4. The arrangement according to claim 1, wherein the bypass means comprise a relay mechanism for switching operations for changing the operation mode of the bypass means.

5. The arrangement according to claim 1, wherein the main power converter comprises means for performing a bi-directional power flow.

6. The arrangement according to claim 1, wherein the arrangement comprises the pre-regulator for boost mode of operation in which an electrolysis current is injected to the fuel cells.

7. An arrangement for improved operability of a high temperature fuel cell device at higher fuel cell voltage values than nominal voltage values, wherein the arrangement comprises:
a fuel cell device comprising a fuel cell, wherein the fuel cell comprises an anode side, a cathode side, and an electrolyte between the anode side and the cathode side,
a main power converter for loading fuel cells at least up to their rated power level, the main power converter comprising galvanic isolation,
a non-isolating pre-regulator for reducing the fuel cell voltage to a voltage level useable with the main power converter at least at substantially low power levels in start-up and low current load situations when the fuel cell voltage is substantially higher than in nominal operation conditions, said pre-regulator being located between the fuel cells and the main power converter, and said pre-regulator being dimensioned for partial load current, and
a mechanism for bypassing the pre-regulator at substantially high current loads when the fuel cell voltage has decreased to the voltage level suitable for an input voltage of the main power converter.

8. A fuel cell device, comprising:
fuel cells, wherein each fuel cell comprises an anode side, a cathode side, and an electrolyte between the anode side and the cathode side, and
the arrangement according to claim 1.

9. The arrangement according to claim 1, wherein the fuel cells are solid oxide fuel cells or molten carbonate fuel cells.

10. A method for improved operability of a high temperature fuel cell device at higher fuel cell voltage values than nominal voltage values, the method comprising:
loading fuel cells at least up to their rated power level by a main power converter, which is galvanically isolated,
arranging a non-isolating pre-regulator between the fuel cells and the main power converter, which pre-regulator is dimensioned for partial load current,
using said pre-regulator to reduce the fuel cell voltage to a voltage level useable by the main power converter at least at substantially low power levels in start-up and low current load situations when the fuel cell voltage is significantly higher than in nominal operation conditions, and
bypassing the pre-regulator at substantially high current loads, when the fuel cell voltage has decreased to a voltage level suitable for an input voltage of the main power converter.

11. The method according to claim 10, wherein the maximum allowed input voltage of the main power converter is less than the maximum fuel cell voltage.

12. The method according to claim 10, wherein the maximum allowed current of the pre-regulator is less than 50% of the rated current of the fuel cells.

13. The method according to claim 10, wherein the bypassing of the pre-regulator is achieved using a relay mechanism for switching operations.

14. The method according to claim 10, wherein a bi-directional power flow is performed by utilizing the main power converter.

15. The method according to claim 10, wherein an electrolysis current is injected to the fuel cells in a boost mode of operation of the pre-regulator.

16. The method according to claim 10, wherein each fuel cell comprises an anode side, a cathode side, and an electrolyte between the anode side and the cathode side.

17. The method according to claim 10, wherein the fuel cells are solid oxide fuel cells or molten carbonate fuel cells.

* * * * *

UNITED STATES PATENT AND TRADEMARK OFFICE
CERTIFICATE OF CORRECTION

PATENT NO. : 9,005,832 B2  
APPLICATION NO. : 14/012381  
DATED : April 14, 2015  
INVENTOR(S) : Kim Åström et al.

Page 1 of 1

It is certified that error appears in the above-identified patent and that said Letters Patent is hereby corrected as shown below:

Title Page, Please Insert

--(30) Foreign Application Priority Data

February 20, 2011   (FI).......................................................20115202--

Signed and Sealed this  
Eighth Day of September, 2015

Michelle K. Lee  
*Director of the United States Patent and Trademark Office*